US009891760B2

(12) United States Patent
Tenuta (10) Patent No.: US 9,891,760 B2
(45) Date of Patent: Feb. 13, 2018

(54) TOUCH SCANNING AND WIRELESS SCANNING IN A PORTABLE COMPUTING DEVICE

(71) Applicant: GOOGLE INC., Mountain View, CA (US)

(72) Inventor: Matthew D. Tenuta, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 790 days.

(21) Appl. No.: 13/909,724

(22) Filed: Jun. 4, 2013

(65) Prior Publication Data

US 2014/0340347 A1    Nov. 20, 2014

Related U.S. Application Data

(60) Provisional application No. 61/825,230, filed on May 20, 2013.

(51) Int. Cl.
  *G06F 3/044* (2006.01)
  *G06F 3/041* (2006.01)
  *G09G 5/00* (2006.01)

(52) U.S. Cl.
  CPC ............ *G06F 3/044* (2013.01); *G06F 3/0416* (2013.01); *G09G 5/00* (2013.01)

(58) Field of Classification Search
  None
  See application file for complete search history.

(56) References Cited

U.S. PATENT DOCUMENTS

| 6,380,930 B1 * | 4/2002 | Van Ruymbeke .... G06F 1/1616 178/18.01 |
| 2008/0165157 A1 * | 7/2008 | Fu et al. ....................... 345/174 |

(Continued)

FOREIGN PATENT DOCUMENTS

| EP | 2642372 A1 | 9/2013 |
| WO | 2014042748 A1 | 3/2014 |
| WO | 2014/189824 A1 | 11/2014 |

OTHER PUBLICATIONS

Invitation to Pay Additional Fees and Partial Search Report for PCT Application No. PCT/US2014/038557, dated Jul. 29, 2014, 7 pages.

(Continued)

*Primary Examiner* — Kent Chang
*Assistant Examiner* — Sujit Shah
(74) *Attorney, Agent, or Firm* — Brake Hughes Bellermann LLP (57) ABSTRACT

In an example implementation, a portable computing device may alternate between scanning for tactile input, such as a user's finger on a trackpad, and scanning for wireless input, such as a near field communication (NFC) signal. If tactile input is received, the portable computing device may stop scanning for wireless input while the portable computing device continues to receive the tactile input. When the portable computing device stops receiving the tactile input, the portable computing device may return to alternating between scanning for tactile input and scanning for wireless input. If wireless input is received, the portable computing device may stop scanning for tactile input while wirelessly communicating with the device from which the wireless input was received. When the portable computing device is finished wirelessly communicating with the device, the portable computing device may return to alternating (Continued)

between scanning for tactile input and scanning for wireless input.

21 Claims, 9 Drawing Sheets

(56) References Cited

U.S. PATENT DOCUMENTS

| | | | |
|---|---|---|---|
| 2011/0050578 A1* | 3/2011 | Lee et al. ................... | 345/168 |
| 2011/0109568 A1* | 5/2011 | Wu et al. ................... | 345/173 |
| 2012/0313901 A1 | 12/2012 | Monson | |
| 2013/0162594 A1* | 6/2013 | Paulsen et al. ............ | 345/174 |
| 2013/0241864 A1* | 9/2013 | Chen et al. ................ | 345/174 |
| 2013/0328785 A1* | 12/2013 | Brooks et al. ............. | 345/170 |

OTHER PUBLICATIONS

"GlidePoint NFC", Cirque Corporation, 2009, 2 pages.

"Integrated NFC in Laptop Trackpad? Data Transfer Made Easy", retrieved from http://www.androidpit.com/laptop-nfc, Jan. 23, 2012, 5 pages.

Paya, "Windows Smartcard Logon With Android Secure Element and NFC", Feb. 24, 2013, retrieved from http://randomoracle.wordpress.com/2013/02/24/windows-smancard-logon-with-android-secure-element-and-nfc/, 3 pages.

International Search Report and Written Opinion for PCT Patent Application No. PCT/US2014/038557, dated Nov. 6, 2014, 21 pages.

* cited by examiner

TOUCH SCANNING AND WIRELESS SCANNING IN A PORTABLE COMPUTING DEVICE

CROSS-REFERENCE TO RELATED APPLICATION

This Application claims priority to U.S. Provisional Application No. 61/825,230, filed May 20, 2013, entitled, "TOUCH SCANNING AND WIRELESS SCANNING IN A PORTABLE COMPUTING DEVICE," the disclosure of which is hereby incorporated by reference.

TECHNICAL FIELD

This description relates to input devices on portable computing devices, such as tactile input devices and wireless input devices.

BACKGROUND

Tactile input devices, such as trackpads in portable computing devices, may detect user input, such as by performing capacitive scans for a user's finger.

SUMMARY

In an example implementation, a portable computing device may alternate between scanning for tactile input, such as a user's finger on a trackpad, and scanning for wireless input, such as a near field communication (NFC) signal. If tactile input is received, the portable computing device may stop scanning for wireless input while the portable computing device continues to receive the tactile input. When the portable computing device stops receiving the tactile input, the portable computing device may return to alternating between scanning for tactile input and scanning for wireless input. If wireless input is received, the portable computing device may stop scanning for tactile input while wirelessly communicating with the device from which the wireless input was received. When the portable computing device is finished wirelessly communicating with the device, the portable computing device may return to alternating between scanning for tactile input and scanning for wireless input.

In an example implementation, coils for detecting wireless input, such as a near field communication (NFC) signal, may be included in a tactile input device, such as in a trackpad. The coils may, for example, be installed in a layer of the tactile input device that is below a layer in which a touch sensor for detecting tactile input is installed. The touch sensor for detecting tactile input may, for example, detect changes in capacitance caused by a user's finger.

In an example implementation, a non-transitory computer-readable storage medium may include instructions stored thereon. When executed by at least one processor, the instructions may be configured to cause a portable computing system including a touch sensor and a wireless scanner to at least, when the portable computing system determines that input is received via the touch sensor, pause scanning in the wireless scanner, and, when the portable computing system determines that input is received via the wireless scanner, pause scanning in the touch sensor.

In an example implementation, a portable computing system may include a touch sensor configured to scan for tactile input, a wireless scanner configured to scan for wireless signals, at least one processor, and at least one memory device. The at last one memory device may comprise instructions stored thereon that, when executed by the at least one processor, are configured to cause the portable computing system to at least, when the portable computing system determines that input is received via the touch sensor, pause scanning in the wireless scanner, and, when the portable computing system determines that input is received via the wireless scanner, pause scanning in the touch sensor.

In an example implementation, a trackpad module may be to be installed in a portable computing device. The trackpad module may include a first layer comprising a touch sensor, the touch sensor being configured to scan for changes in capacitance, a second layer comprising at least a first near field communication (NFC) coil and a second NFC coil, the first and second NFC coils being configured to send and scan for wireless signals, and a third layer comprising an NFC controller, the NFC controller being configured to process wireless signals received via the first and second NFC coils and send wireless signals via the first and second NFC coils.

In an example implementation, a non-transitory computer-readable storage medium may include means for causing a portable computing system including a touch sensor and a wireless scanner to at least, when the portable computing system determines that input is received via the touch sensor, pause scanning in the wireless scanner, and, when the portable computing system determines that input is received via the wireless scanner, pause scanning in the touch sensor.

In an example implementation, a portable computing system may include means for scanning for tactile input, means for scanning for wireless signals, means for processing instructions, and means for storing instructions and/or data. The means for storing instructions and/or data may include means for causing the portable computing system to at least, when the portable computing system determines that input is received via the touch sensor, pause scanning in the wireless scanner, and, when the portable computing system determines that input is received via the wireless scanner, pause scanning in the touch sensor.

In an example implementation, a trackpad module may be to be installed in a portable computing device. The trackpad module may include means for scanning for changes in capacitance, means for sending and scanning for wireless signals, and means for processing the wireless signals received.

The details of one or more implementations are set forth in the accompanying drawings and the description below. Other features will be apparent from the description and drawings, and from the claims.

DETAILED DESCRIPTION

A tactile input device, such as a trackpad module or touchpad module, for use with a portable computing device can be used to communicate with and control operations of the portable computing device. The portable computing device may include, for example, a laptop or notebook computer, a netbook, or a thin client. The tactile input device can be configured to be contacted by a user on a top surface of the tactile input device to trigger an electronic signal within the portable computing device. For example, a user can slide or move one or more fingers, or, in some cases, knuckles or a portion of a hand, across the top surface of the tactile input device to move a cursor visible on a display of the computing device. Some functionality of a cellular phone, such as wireless communication with a Smartcard to transmit and receive information to facilitate a payment transaction, can be included in the tactile input device. The touch scanning performed by the tactile input device 106 to detect touch input may be synchronized with wireless scanning to detect wireless input from the Smartcard to prevent interference between the touch scanning and the wireless scanning. As used herein, a reference to a top view in a figure refers to a view as viewed by a user during use of the tactile input device. For example, a top view can refer to a view of the tactile input device as disposed within the portable computing device such that the user can contact the top surface of the tactile input device to initiate an action within the portable computing device.

Figure 1:
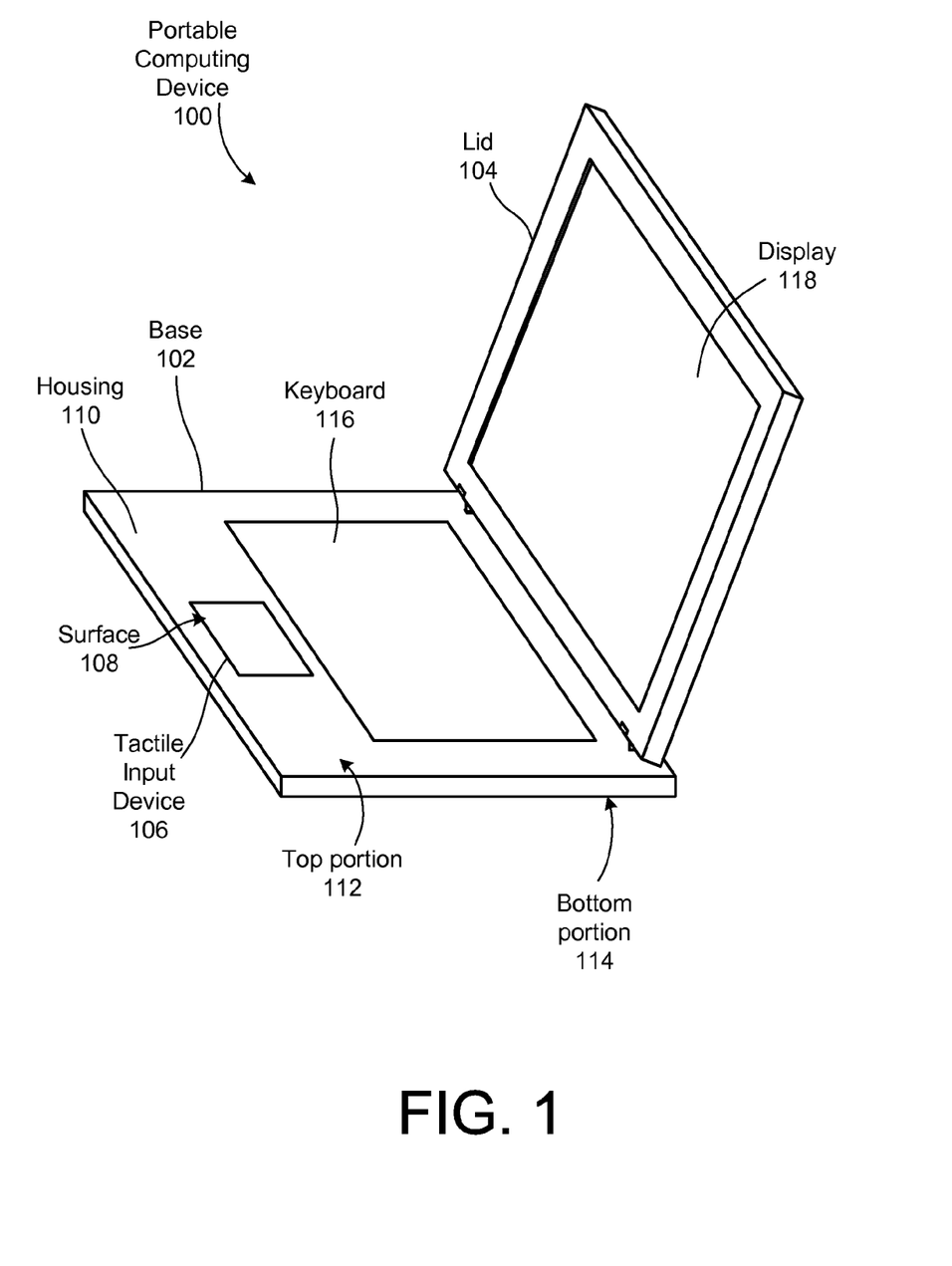
FIG. 1 is a diagram of a portable computing device including a tactile input device according to an example implementation.

FIG. 1 is a diagram of a portable computing device 100 including a tactile input device 106 according to an example implementation. The portable computing device 100 may include a base 102 and a lid 104. The lid 104 may include a display 118 that can be, for example, a liquid crystal display (LCD), a light emitting diode (LED) display, or other type of electronic visual display device. The base 102 can include, among other components, a tactile input device 106, a housing 110, and a keyboard 116. The housing 110 may include a top portion 112 and a bottom portion 114.

The tactile input device 106 can include a top surface 108, which may be made of a non-conductive material such as glass, configured to receive inputs (e.g., a touch, swipe, scroll, drag, click, hold, tap, combination of inputs, etc.) by a user, and a touch sensor (not shown). The touch sensor can be activated when a user enters an input on the top surface 108 of the tactile input device 106, and can communicate electronic signals within the computing device 100. The tactile input device 106 can include, for example, a multi-layer printed circuit board (PCB) shown and described with respect to later figures, such as a flame-retardant class-4 (FR4) PCB. The PCB may also include a wireless communication device or wireless scanner, such as a near field communication (NFC) scanner.

Other components, such as a dome switch, adhesive sheets, and cables (not shown) may also be integrated in the portable computing device 100 to process input by a user via the tactile input device 106 and/or keyboard 116. Various elements shown in the display 118 of the portable computing device 100 may be updated based on various movements of contacts on the tactile input device 106 and/or keyboard 116. Tactile input devices, such as the tactile input device 106, may be used in self-contained portable laptop computers such as the portable computing device 100, and do not require a flat surface near the computer. The tactile input device 106 may be position close to the keyboard 116.

The components of the input devices (e.g., 106, 116) described here can be formed with a variety of different materials such as plastic, metal, glass, ceramic, etc. used for such components. The housing 110 of the base 102 can each be formed, at least in part, with a conductive material such as a stainless steel material, for example, SUS301 or SUS304, or aluminum.

Figure 2A:
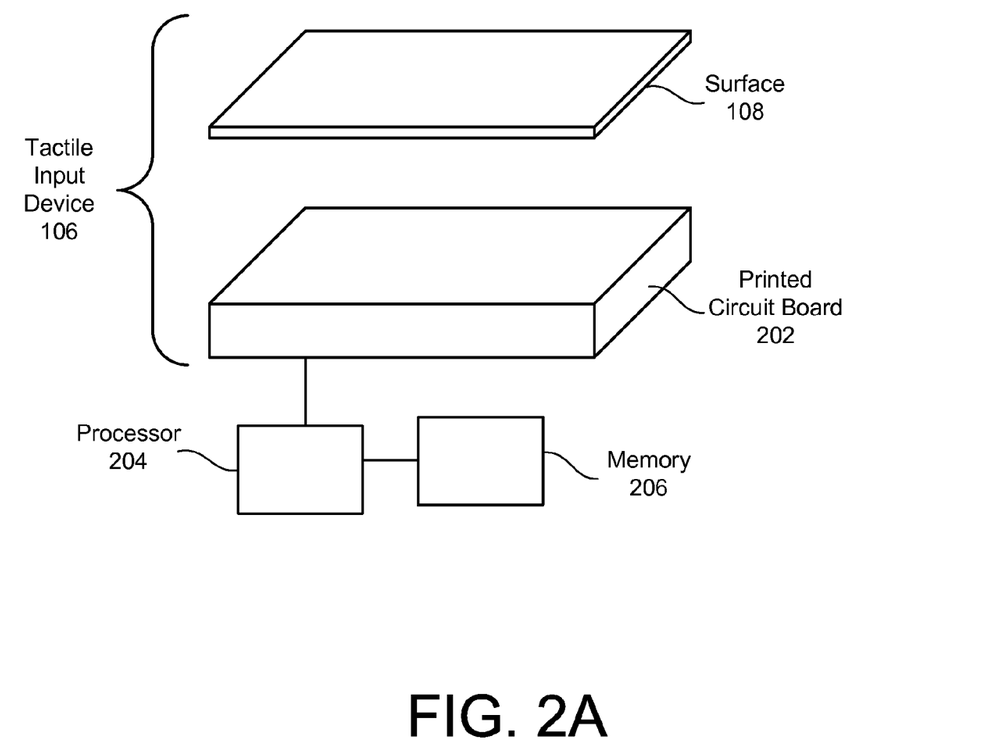
FIG. 2A is a diagram showing the tactile input device, a processor, and a memory according to an example implementation.

FIG. 2A is a diagram showing the tactile input device 106, a processor 204, and a memory 206 according to an example implementation. The processor 204 and memory 206 may be components of the portable computing device 100 shown in FIG. 1, and may be included in the base 102 of the portable computing device 100.

The tactile input device 106 may include the surface 108 and a printed circuit board (PCB) 202. The PCB 202 may include a trackpad module and/or touchpad module. The surface 108 may be made of glass. The surface 108 may, for example, protect the PCB 202 from being damaged by contact from the user or objects. A user may place, tap, or slide his or her finger along the surface 108 to provide input to the tactile input device 106. The PCB 202 may include a touch sensor such as a capacitive sensor for sensing tactile input, coils for sensing and sending NFC signals, and controllers for controlling the touch sensor and coils.

The processor 204 may include at least one processor with one or multiple cores capable of performing functions and executing instructions to perform the processes and functions described herein. The memory 206 may include at least one memory device configured to store data and/or instructions, such as instructions to perform the functions and processes described herein. The memory 206 may store, for example, instructions that, when executed by the processor 204, cause the portable computing device 100 to perform the processes and functions described herein.

Figure 2B:
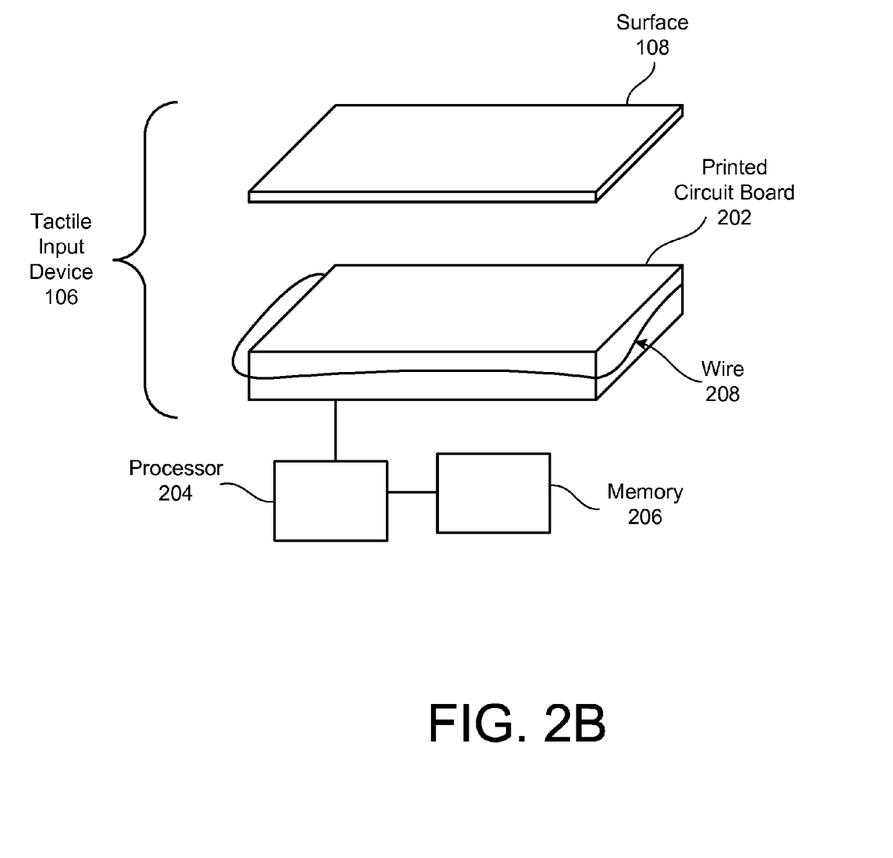
FIG. 2B is a diagram showing the tactile input, a processor, and a memory according to another example implementation.

FIG. 2B is a diagram showing the tactile input device 106, the processor 204, and the memory 206 according to another example implementation. In this example, a wire 208 may partially or fully surround the printed circuit board 202 and/or the surface 108. The wire 208 may serve as a coil for detection and sending of wireless signals, such as NFC signals. The wire 208 may be a component of the wireless scanner, and may supplement or replace the coils shown in FIGS. 3C and 4C. The wire 208 may receive, for example, wireless/electromagnetic signals and pass the wireless/electromagnetic signals onto a wireless controller, and generate wireless/electromagnetic signals based on instructions and/or signals received from the wireless controller.

Figure 3A:
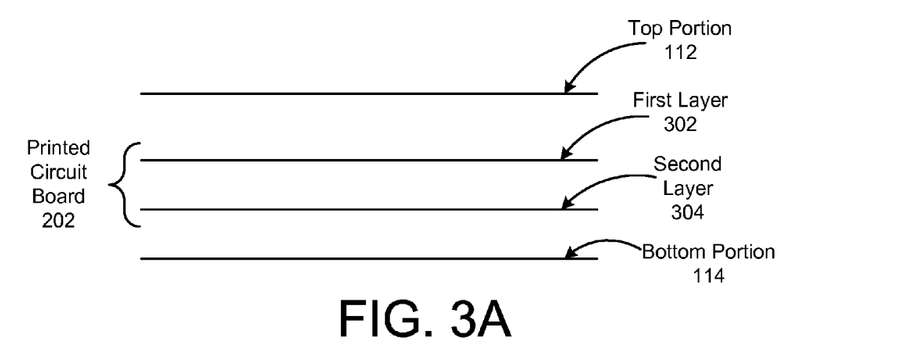
FIG. 3A is a diagram showing a printed circuit board (PCB) of the tactile input device within a base of the portable computing device according to an example implementation in which the PCB has two layers.

FIG. 3A is a diagram showing the PCB 202 of the tactile input device 106 within the base 102 of the portable computing device 100 according to an example implementation in which the PCB 202 has two layers. In this example, the PCB 202 has a first layer 302 and a second layer 304. The PCB 202 is between a top portion 112 of the base 102 and a bottom portion 114 of the base 102. While not shown in FIG. 3A, the surface 108 may be located within an aperture of the top portion 112 of the base 102, and may be enclosed by the top portion 112 of the base 102. The surface 108 may be made of a non-conductive material such as glass, allowing wireless signals to pass through the surface 108, while the housing 110 of the base 102, including the top portion 112, may be made of a conductive material such as metal including aluminum, which would block wireless signals. The first layer 302 is above the second layer 304, closer to the top portion 112 of the base 102 than the second layer 304. The second layer 304 is below the first layer 302, closer to the bottom portion 114 of the base 102 than the first layer 302. While not shown in the figures, the first and second layers 302, 304 may include interconnects between components of the tactile input device 106.

Figure 3B:
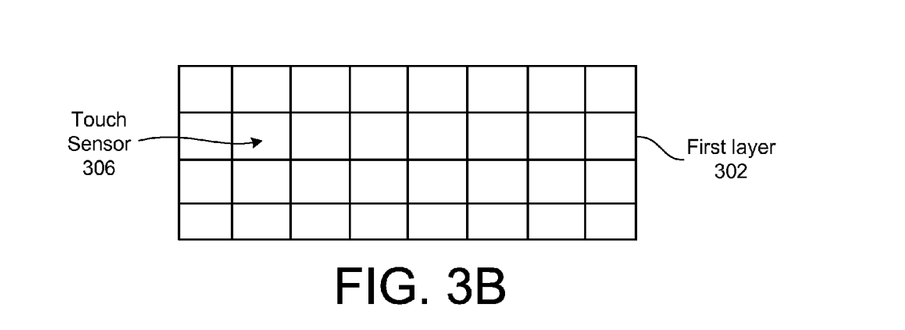
FIG. 3B is a diagram showing a first layer of the PCB according to the example implementation shown in FIG. 3A.

FIG. 3B is a diagram of the first layer 302 of the PCB 202 according to the example implementation shown in FIG. 3A. In this example, the first layer 302 includes a touch sensor 306. Touch sensor 306 may be configured to detect touch input from a user to the tactile input device 106. The touch sensor 306 may, for example, include a capacitive grid. The touch sensor 306 may include any number of columns and rows of wires forming a sensor grid. In an example implementation, the touch sensor 306 may include eighteen rows of capacitors. While the touch sensor 306 is shown in FIG. 3B as rectangular, the touch sensor 306 may be in any shape, such as circular or oval. The wires may be spaced any distance apart from each other, such as a few millimeters, and may be designed to sense tactile input. The wires of the touch sensor 306 may detect capacitive changes. The wires of the touch sensor 306 may detect capacitive changes caused by a user's finger touching, tapping, or sliding over the tactile input device 106. The touch sensor 306 sends signals reflecting the changes in capacitance caused by the user's finger to a controller included in the tactile input device 106.

The touch sensor 306 may perform capacitive scans. In an example implementation, the capacitive scans performed by the touch sensor 306 may have a frequency between one hundred and one hundred and fifty kilohertz. The touch sensor 306 may scan the entire area of the touch sensor 106 in one to two milliseconds. The capacitive scans may interfere with scanning for or sending wireless signals, such as NFC signals. In an example implementation, it may not be possible to perform the capacitive scan and the wireless scan within the tactile input device 106 at a same time while maintaining an acceptable signal-to-noise-and-interference (SINR) ratio and/or acceptably low error probability in interpreting input.

Figure 3C:
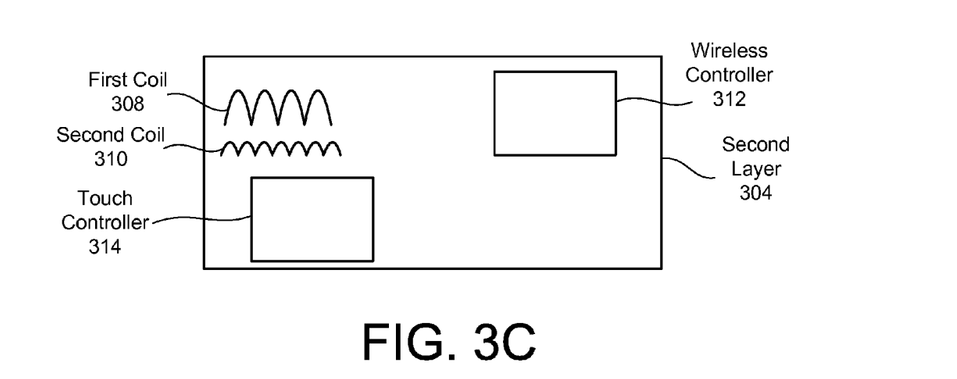
FIG. 3C is a diagram showing a second layer of the PCB according to the example implementation shown in FIG. 3A.

FIG. 3C is a diagram of the second layer 304 of the PCB 202 according to the example implementation shown in FIG. 3A. In this example, the second layer 304 may include at least one coil, or multiple coils, for the wireless scanner, such as the NFC scanner. FIG. 3C shows a first coil 308 and a second coil 310. While two coils 308, 310 are shown in FIG. 3C, many more than two coils may be included in the second layer 304. In an example implementation, the coils 308, 310 may have different sizes and/or diameters. For example, the first coil 308 may have a diameter that is at least twice a diameter of the second coil 310. The wireless scanner may have sets of coils of different diameters, such as a first set of coils of a first diameter, and a second set of coils of a second diameter, with the first diameter being at least twice the second diameter. The first and second coils 308, 310 may detect wireless and/or electromagnetic signals received from an electronic device outside the portable computing device, such as a Smartcard communicating with the NFC scanner. The first and second coils 308, 310 may also generate and send signals to the electronic device. The coils 308, 310 may scan and generate signals at a frequency of, for example, between thirteen and fourteen megahertz.

The coils 308, 310 may be in communication with a wireless controller 312. The wireless controller 312 may perform processes including processing and generating signals to communicate with the electronic device via the coils 308, 310. The wireless controller 312 may also perform authentication techniques, such as a handshake protocol with the electronic device such as a Smartcard, and may process payments by the Smartcard. The wireless controller 312 may include an integrated circuit containing a processor, memory including firmware to perform the functions and processes described herein with respect to the wireless controller 312, wireless scanner, and/or NFC scanner, and input/output peripherals. The coils 308, 310 and wireless controller 312 may collectively comprise the wireless scanner and/or NFC scanner.

The second layer 304 may also include a touch controller 314. The touch controller 314 may receive and process signals from the touch sensor 306. The touch controller 314 may provide raw data received from the touch sensor 306 to the processor 204, or the touch controller 314 may interpret the raw data and send gesture signals to the processor 204. In the example in which the touch controller 314 interprets the raw data and sends gesture signals to the processor 204, the touch controller 314 may recognize movements across the tactile input device 106 by a user. The touch controller 314 may include an integrated circuit containing a processor, memory including firmware to perform the functions and processes described herein with respect to the touch controller 314 and/or tactile input device 106, and input/output peripherals. The touch sensor 306 shown and described with respect to FIG. 3B and the touch controller 314 may collectively comprise a touch scanner.

As discussed above, wireless scans by the coils 308, 310 may interfere with capacitive scans by the touch sensor 306. The touch scanner and wireless scanner may alternate scan times and/or time slots. For example, the touch scanner may scan for five milliseconds and then the wireless scanner may scan for one millisecond, followed by the touch scanner again scanning for five milliseconds and the wireless scanner scanning for one millisecond. This is merely an example, and other scanning intervals may be performed. When either the touch scanner or the wireless scanner receives and/or recognizes a signal, the other scanner may stop scanning to allow the receiving and/or recognizing scanner to continue scanning without interference. The wireless controller 312 and touch controller 314 may communicate with each other directly to allocate scanning slots and/or intervals and to indicate when a signal has been received and/or recognized, or may be assigned scanning slots and/or intervals and be instructed to stop scanning by a controller (not shown) on the PCB 202, or may be assigned scanning slots and/or intervals and be instructed to stop scanning by the processor 204 shown in FIGS. 2A and 2B, according to example implementations. The touch scanner and/or wireless scanner may synchronize their scanning based on a device in the portable computing device 100 other than the touch scanner or wireless scanner, such as based on a clock maintained or associated with the display 118 shown in FIG. 1, according to an example implementation.

Figure 4A:
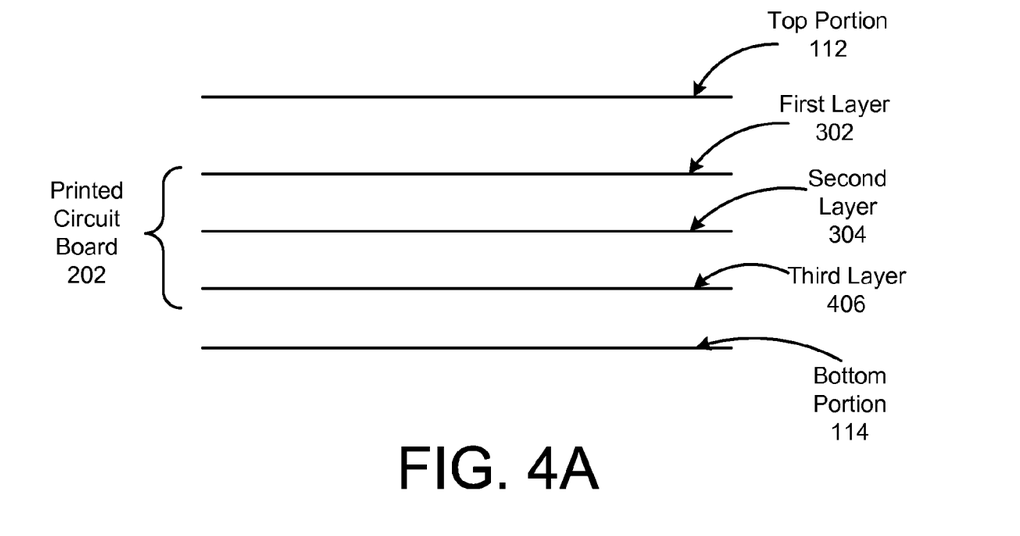
FIG. 4A is a diagram showing a PCB of the tactile input device within a base of the portable computing device according to another example implementation in which the PCB has three layers.

FIG. 4A is a diagram showing the PCB 202 of the tactile input device 106 within the base 102 of the portable computing device 100 according to an example implementation in which the PCB 202 has three layers. In this example, the PCB 202 includes a first layer 402, a second layer 404 and a third layer 406. While not shown in FIG. 4A, the surface 108 may be located within an aperture of the top portion 112 of the base 102, and may be enclosed by the top portion 112 of the base 102. The surface 108 may be made of a non-conductive material such as glass, allowing wireless signals to pass through the surface, while the housing 110 of the base 102, including the top portion 112, may be made of a conductive material such as metal including aluminum, which would block wireless signals. In this example, the first layer 402 is above, and closer to the top portion 112 than, the second layer 404 and the third layer 406. The second layer 404 is between the first layer 402 and the second layer 406, and below the first layer 402 and above the third layer 406. The third layer 406 is below, and closer to the bottom portion 114 of the base 102 than, the first layer 402 and the second layer 404. While not shown in the figures, the first, second, and third layers 402, 404, 406 may include interconnects between components of the tactile input device 106.

Figure 4B:
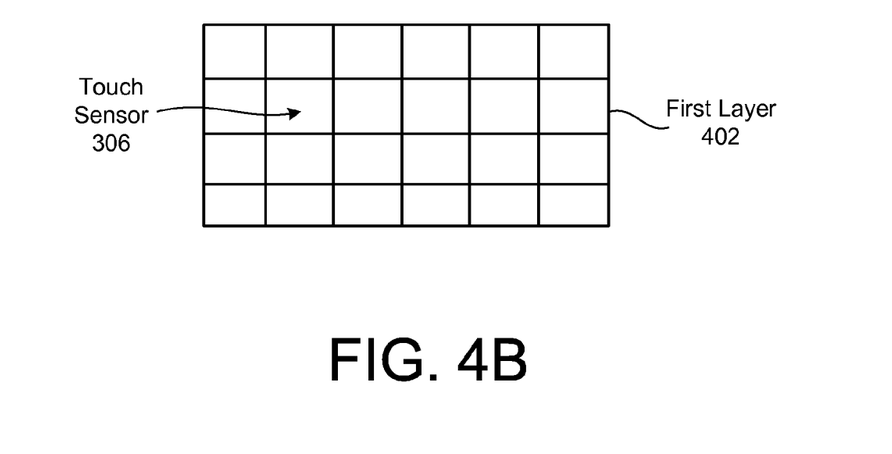
FIG. 4B is a diagram showing a first layer of the PCB according to the example implementation shown in FIG. 4A.

FIG. 4B is a diagram of the first layer 402 of the PCB 202 according to the example implementation shown in FIG. 4A. In this example, the first layer 402 includes the touch sensor 306. The touch sensor 306 includes the components and functionalities of the touch sensor 306 described above with respect to FIG. 3B.

Figure 4C:
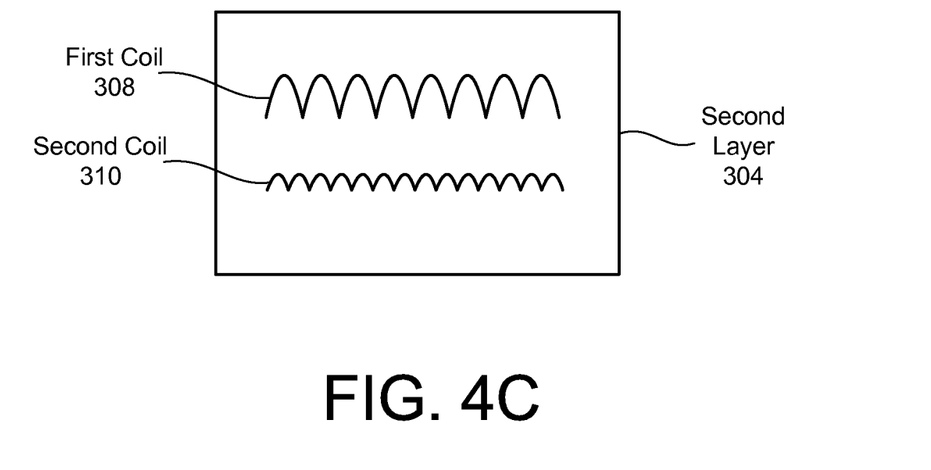
FIG. 4C is a diagram showing a second layer of the PCB according to the example implementation shown in FIG. 4A.

FIG. 4C is a diagram of the second layer 404 of the PCB 202 according to the example implementation shown in FIG. 4A. In this example, the second layer 404 includes at least one coil, or multiple coils 308, 310 for detecting and sending wireless and/or electromagnetic signals from and to an electronic device outside the portable computing device 100, such as signals of a Smartcard. While FIG. 4C shows two coils 308, 310, many more coils may be included in the second layer 404. The coils 308, 310 shown in FIG. 4C may have similar features and functions to the coils 308, 310 shown and described with respect to FIG. 3C.

Figure 4D:
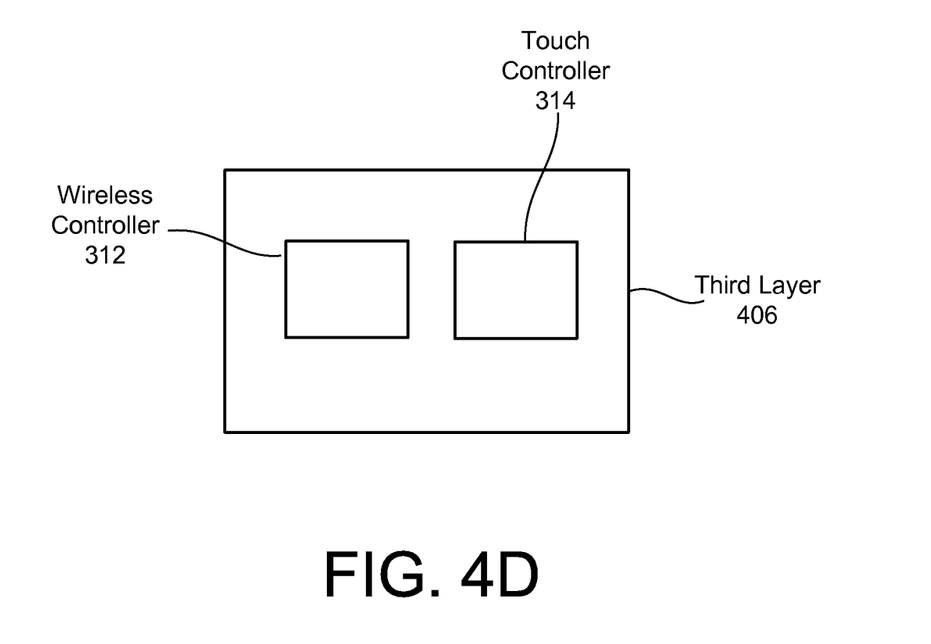
FIG. 4D is a diagram showing a third layer of the PCB according to the example implementation shown in FIG. 4A.

FIG. 4D is a diagram showing the third layer 406 of the PCB 202 according to the example implementation shown in FIG. 4A. In this example, the third layer 406 includes a wireless controller 312 and a touch controller 314. The wireless controller 312 and touch controller 314 may have similar features and functionalities as the wireless controller 312 and touch controller 314 described above with respect to FIG. 3C.

Figure 5:
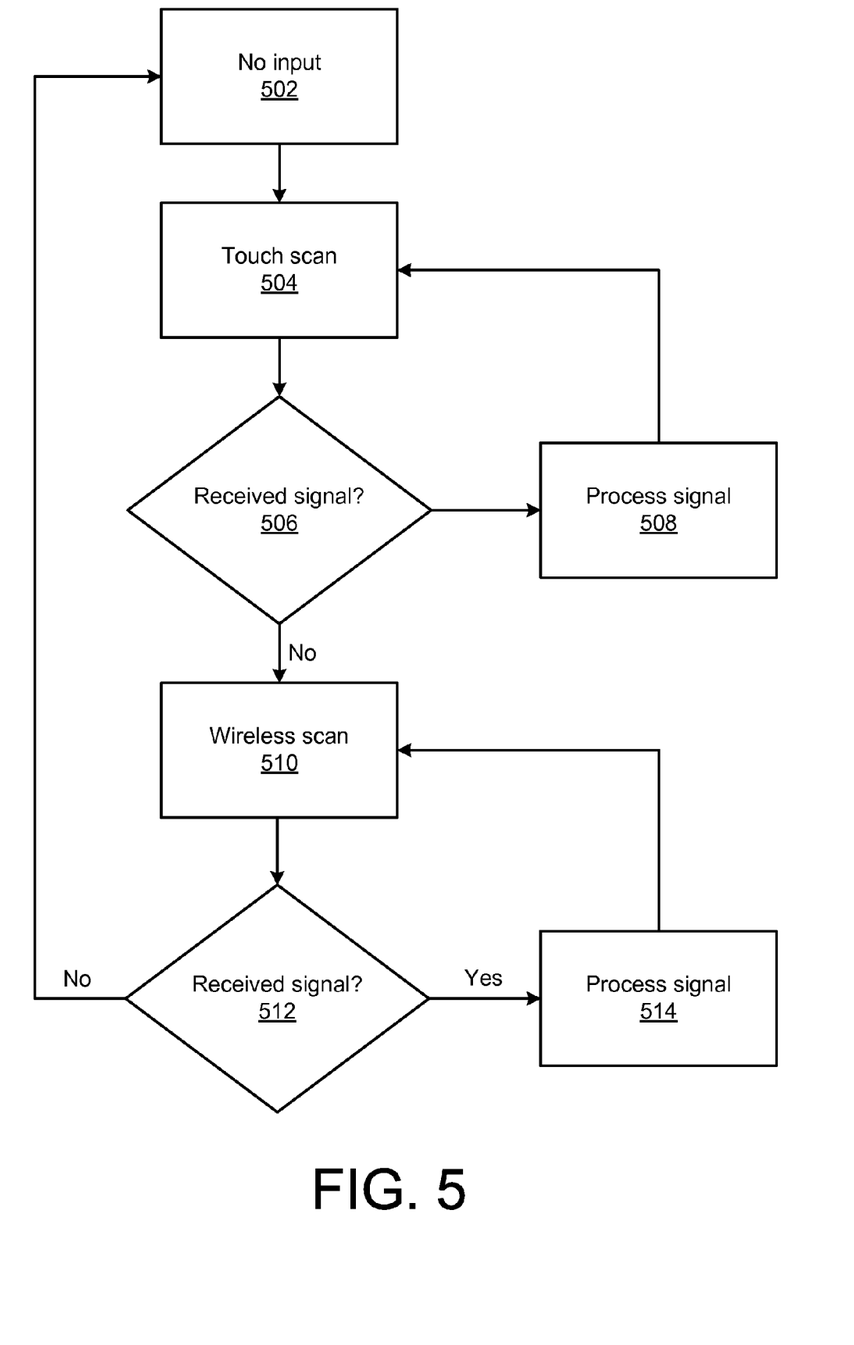
FIG. 5 is a flow diagram showing a process performed by the portable computing device according to an example implementation.

FIG. 5 is a flow diagram showing a process performed by the portable computing device 100 according to an example implementation. The determination of which part of the process is performed may be determined by the processor 204 in a centralized decision-making scheme, or in a distributed decision-making scheme, the determinations may be made by the wireless controller 312 and touch controller 314 based on messages sent between the wireless controller 312 and touch controller 314. In this example, the process may begin when no input is received via either the touch scanner or the wireless canner scanner (502).

The process may include the touch sensor 306 of the touch scanner performing a scan for touch input, such as capacitive scan (504). The scan for touch input may include scanning for changes in capacitance, such as the touch sensor 306 detecting whether changes in capacitance occur based on a user touching, tapping, or sliding his or her finger over the tactile input device 106. The process may also include the touch controller 314 of the touch scanner determining whether a signal is received based on the capacitive scan (506). In an example implementation, the scanning for touch input (504) and determining whether a signal was received (506) may be performed for about five milliseconds before proceeding to the wireless scan described below. The touch controller 314 may, for example, receive and interpret input from the touch sensor 306 reflecting any changes in capacitance at the touch sensor 306, and determining whether the input reflects a valid signal or input from the user or is merely noise.

If a valid signal is received based on the capacitive scan, then the process may include the touch controller 314 processing the signal received via the capacitive scan (508). Processing the signal received via the capacitive scan may also include stopping scanning in the wireless scanner. The touch controller 314 may instruct the wireless controller 312 to stop scanning by the coils 308, 310, or the processor 204 may instruct the wireless controller 312 to stop scanning by the coils 308, 310. After stopping the scanning by the wireless scanner and processing the touch signal receive (508), the process may repeat the scanning for touch input such as the capacitive scan (504). The process may continue the scanning for touch input such as capacitive scans without any wireless scanning until no touch input is received.

After no touch signal is received, the process may include performing a wireless scan (510), such as a scan for NFC signals. The process may also include determining whether a valid wireless signal, such as an NFC signal, is received (512). In an example implementation, the wireless scan (510) and determination of whether a wireless signal was received (512) may be performed for about one millisecond before proceeding to the touch scan described above. When scanning for NFC signals, the coils 308, 310 may send probes at a low transmission power, such as a transmission power low enough not to send detectable signals farther than one foot. If the wireless controller 312 successfully decodes a Smartcard tag, then the wireless controller 312 may determine that the wireless scanner is in communication with a Smartcard, and instruct the touch scanner to stop the capacitive scanning, as discussed with respect to (514) below.

If no valid wireless signal is received, then the process may return to the no input (502), alternating between the touch scan (504) and the wireless scan (510). In an example implementation, the process may alternate between about five milliseconds of touch scan (504) and about one millisecond of wireless scan (510). These durations of scans may be controlled or changed by firmware included in the tactile input device 106 and/or portable computing device 100, such as by the processor 204.

If a valid signal is received by the wireless scan, then the process may include processing the wireless signal (514). Along with processing the signal (514), the process may also include stopping the touch scan. The touch scan may be stopped by the wireless controller 312 instructing the touch controller 314 to stop the touch and/or capacitive scans, or by the processor 204 instructing the touch controller 314 to stop the touch and/or capacitive scans. After the processing the signal (514), the process may continue to include performing the wireless scan (510) until no more valid wireless signals are received by the wireless scan, at which point, the process will return to the no input state (502) and alternate between the touch scan (504) and the wireless scan (510).

Figure 6:
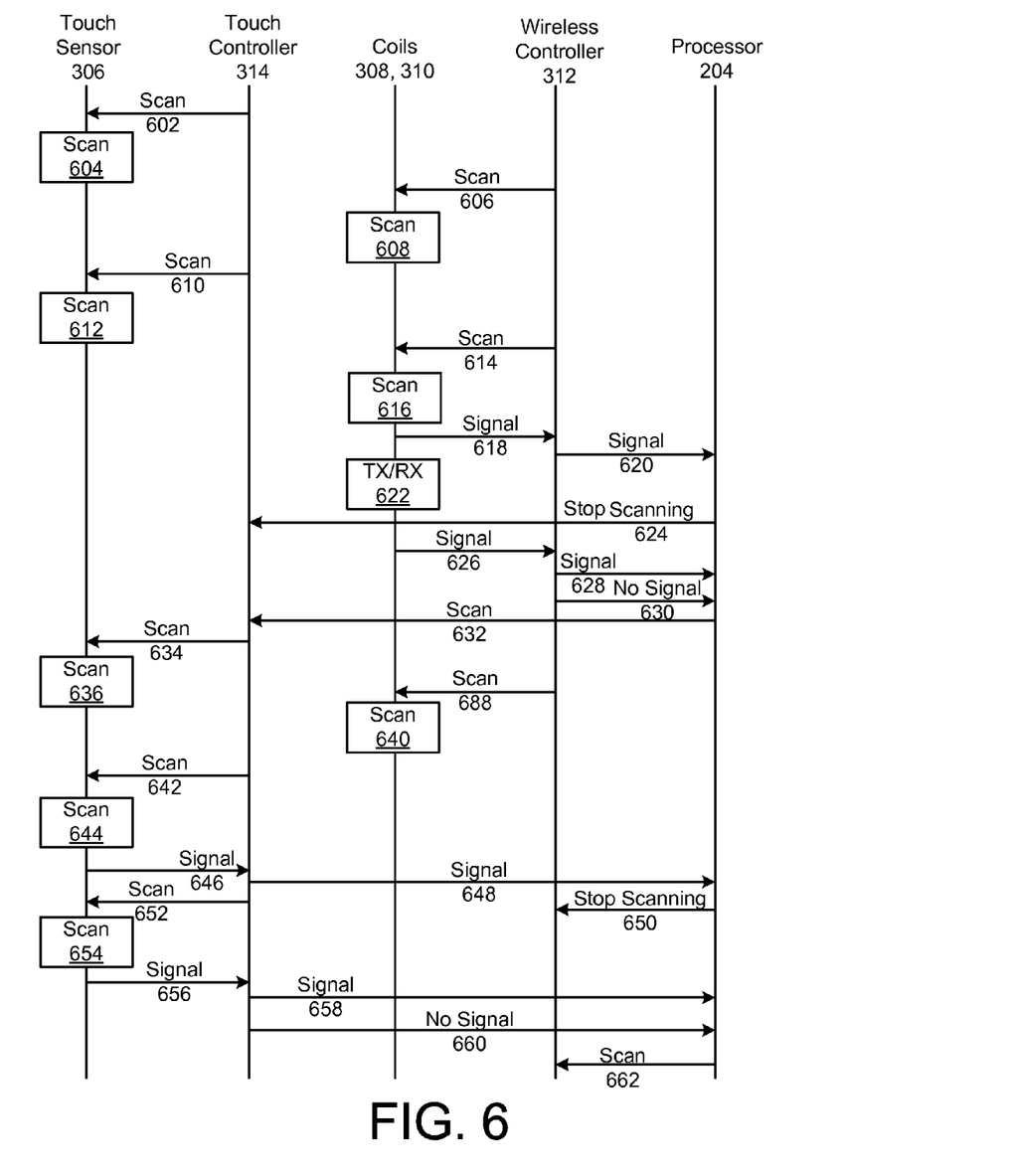
FIG. 6 is a timing diagram showing actions performed by components of the portable computing device according to an example implementation.

FIG. 6 is a timing diagram showing functions performed by the touch scanner and wireless scanner according to an example implementation. As discussed above with respect to FIG. 5, the process may begin with alternating touch scanning and wireless scanning.

In an example implementation, the touch controller 314 may send a scan instruction 602 to the touch sensor 306. In response to receiving the scan instruction 602, the touch sensor 306 may perform the touch scan 604, such as the capacitive scan. If no input is detected during the touch scan 604, the wireless controller 312 may send a scan instruction 606 to the coils 308, 310. In response to receiving the scan instruction 606, the coils 308, 310 may perform a wireless scan 608, which may include a scan for NFC signals. If the coils 308, 310 do not receive any signal, then the touch controller 314 may send another scan instruction 610 to the touch sensor 306. In response to receiving the scan instruction 610, the touch sensor 306 may perform another scan 612. If the touch sensor 306 does not receive an input, the wireless controller 312 may send another scan instruction to the coils 308, 310. The coils 308, 310 may, in response to receiving the scan instruction 614, perform a touch scan 616.

If the coils 308, 310 do receive an input during the scan 616, then they may send a signal 618 reporting the input to the wireless controller 312. In response to receiving the signal 618, the wireless controller 312 may process the signal 618 and send a signal message 620 to the processor 604. The signal message 620 may indicate to the processor 604 that a wireless signal, such as an NFC signal, has been received by the wireless scanner, which may include an NFC scanner. The coils 308, 310 may, after receiving the signal, continue receiving and/or transmitting signals 622 from and to the electronic device outside the portable computing device 100, which may be a Smartcard. The wireless scanner may, for example, engage in an authentication protocol and/or exchange payment or sales information with the electronic device.

In response to receiving the signal message 620, the processor 204 may send a stop scanning instruction 624 to the touch controller 314. In response to receiving the stop scanning instruction 624, the touch controller 314, touch sensor 306, and/or touch scanner may stop performing touch scans. While FIG. 6 shows the wireless controller 312 sending the signal message 620 to the processor 204, and the processor 204 sending the stop scanning instruction 624 to the touch controller 314, this is merely an example. In another example, the wireless controller 312 may send a stop scanning instruction directly to the touch controller 314.

The coils 308, 310 may, in response to receiving signals, continue to send signals 626 to the wireless controller 312 indicating they are received signals. The wireless controller 312 may send a signal message 628 to the processor 204 reporting the signal 626 received from the coils 308, 310. The processor 204 may respond to receiving the signal message 628 by sending the touch controller 314 another stop scanning instruction, or by not sending a resume scanning instruction to the touch controller 314. After not receiving any signal from the coils 308, 310 for a predetermined amount of time, the wireless controller 312 may send a no signal message 630 to the processor 204, informing the processor 204 that no signal or input has been received at the wireless scanner. In another example implementation, the wireless controller 312 may not send a no signal message 630 to the processor 204, and the processor 204 may determine that no signal has been received at the wireless scanner based on not receiving any signal message from the wireless controller 312.

After the processor 204 has determined that no signal has been received at the wireless scanner for a predetermined period of time, the processor 204 may send a scan instruction 632 to the touch controller 314. The scan instruction 632 may instruct the touch controller 314 to resume scanning. While FIG. 6 shows the processor 204 sending the scan instruction 632 to the touch controller 314, this is merely an example. In another example implementation, the wireless controller 612 may send a message to the touch controller 314 prompting the touch controller 314 to resume scanning.

The touch controller 314 may respond to receiving the scan instruction 632 by sending a scan instruction 634 to the touch sensor 306. The touch sensor 306 may respond to receiving the scan instruction 634 by performing a scan 636. If no signal is received at the touch sensor 306 during the touch scanner's time slot, the wireless scanner may scan during its time slot, and the wireless controller 312 may again send a scan instruction 638 to the coils 308, 310. The coils 308, 310 may respond to receiving the scan instruction 638 by performing a scan 640. If the coils 308, 310 do not receive any input or detect a signal during the wireless scanner's time slot, the touch controller 314 may send another scan instruction 642 to the touch sensor 306. The touch sensor 306 may respond to receiving the scan instruction 642 by performing a scan 644.

If the touch sensor 306 receives an input, the touch sensor 306 may send a signal 646 reflecting the input to the touch controller 314. The touch controller 314 may respond to receiving the signal 646 by sending a signal message 648 to the processor 204. The touch controller 314 may also send another scan instruction 652 to the touch sensor 306, prompting the touch sensor 306 to continue scanning after receiving the input during the scan 644.

The processor 204 may respond to receiving the signal message 648 by sending a stop scanning instruction 650 to the wireless controller 312. The stop scanning instruction 650 may cause the wireless scanner to stop scanning while the touch scanner is receiving touch input. While FIG. 6 shows the processor 204 sending the stop scanning instruction 650 to the wireless controller 312, this is merely an example. In another example implementation, the touch controller 314 may send a stop scanning instruction to the wireless controller 312.

The touch sensor 306 may continue scanning 654 based on receiving the scan instruction 652. The touch sensor 306 may send a signal 656 reflecting input received to the touch controller 314. The touch sensor 306 may continue scanning as long as it continues to receive signals. The touch controller 314 may send signal messages 658 to the processor 204, indicating that the touch sensor 306 is still receiving input. When the touch sensor 306 is no longer receiving input, the touch controller 314 may send a no signal message 660 to the processor 204, informing the processor 204 that no input has been received at the touch scanner. Or, the processor 204 may determine that the touch scanner has not received an input based on not receiving a signal message for a predetermined period of time.

Based on determining that the touch scanner has not received input for a predetermined period of time, the processor 204 may send a scan instruction 662 to the wireless controller 312, prompting the wireless scanner to resume scanning in the alternating scanning mode. In another example implementation, the processor 204 and/or touch controller 314 may, instead of sending the scan instruction to the wireless controller 312, send signal or stop scanning messages to the wireless controller 312 as long as signals are received at the touch sensor 306, and the wireless controller 312 may determine that the wireless scanner should resume scanning based on not receiving a stop scanning instruction for a predetermined period of time.

Figure 7:
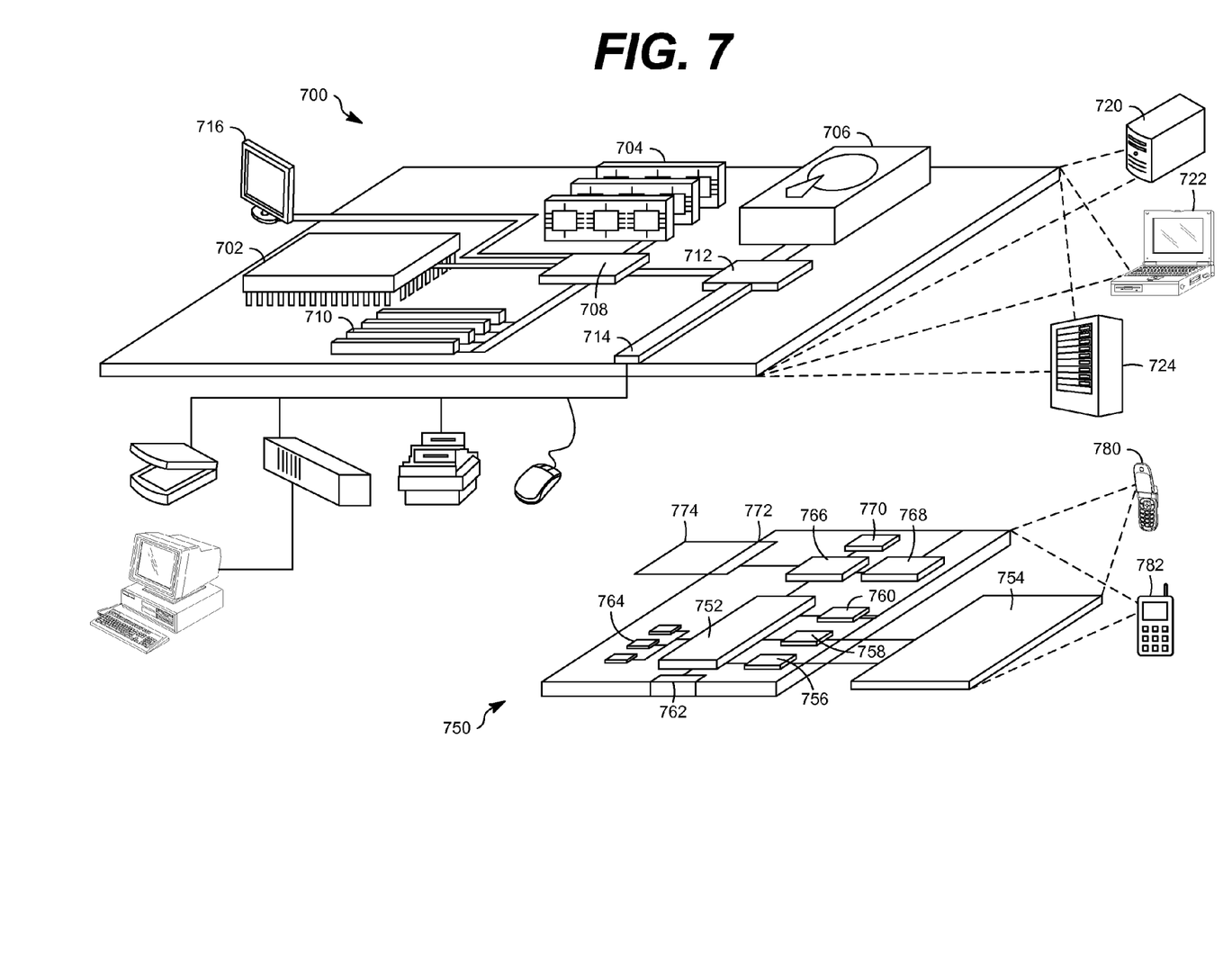
FIG. 7 shows an example of a computer device and a mobile computer device that can be used to implement the techniques described herein.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A portable computing device comprising:
   a base comprising a housing, the housing including a top portion, a bottom portion, and sides adjacent to both the top portion and the bottom portion, the housing being made of a conductive material, the top portion defining an aperture;
   a tactile input device located within the aperture defined by the top portion of the base, the tactile input device including a top surface made of a non-conductive material and a three-layer printed circuit board (PCB), the three-layer PCB comprising:
a first layer comprising a touch sensor configured to scan for tactile input;
a second layer comprising a wireless scanner configured to scan for wireless signals, the wireless scanner including at least one coil; and
a third layer comprising a touch controller controlling the touch sensor and a wireless controller controlling the wireless scanner;
at least one processor enclosed by the base;
at least one memory device enclosed by the base, the at least one memory device comprising instructions stored thereon that, when executed by the at least one processor, are configured to cause the portable computing device to at least:
when the portable computing system determines that input is received via the touch sensor, pause scanning in the wireless scanner; and
when the portable computing system determines that input is received via the wireless scanner, pause scanning in the touch sensor; and a lid rotatably attached to the base, the lid including a display.

2. The portable computing device of claim 1, wherein:
the touch sensor includes a capacitive sensor; and
the wireless scanner includes a near field communication (NFC) scanner.

3. The portable computing device of claim 1, wherein the instructions stored on the at least one memory device are configured to cause the touch sensor to synchronize scanning based on a clock associated with the display.

4. The portable computing device of claim 1, wherein the touch sensor comprises a capacitive sensor configured to scan for the tactile input.

5. The portable computing device of claim 1, wherein the touch sensor is configured to perform a capacitive scan at a frequency between 100 kHz and 150 kHz for between one and two milliseconds before the wireless scanner performs a scan.

6. The portable computing device of claim 1, wherein the wireless scanner comprises a near field communication (NFC) scanner.

7. The portable computing device of claim 6, wherein the determining that input is received via the NFC scanner includes completing a handshake protocol with a smartcard, the smartcard being outside of the portable computing device.

8. The portable computing device of claim 1, wherein the instructions are configured to cause the portable computing device to alternate between scanning in the wireless scanner and scanning in the touch sensor.

9. The portable computing device of claim 8, wherein the instructions stored on the at least one memory device are configured to cause the portable computing device to:
change a duration of scanning in the wireless scanner before scanning in the touch sensor; and
change a duration of scanning in the touch sensor before scanning in the wireless scanner.

10. The portable computing device of claim 1, wherein:
the top portion of the base is configured to face the lid when the portable computing device is in a closed position; and the at least one coil is between the touch sensor and the bottom portion of the base.

11. The portable computing device of claim 1, wherein the second layer is located between the first layer and the third layer.

12. The portable computing device of claim 1, wherein the housing of the base is made of metal.

13. The portable computing device of claim 12, wherein the top surface of the tactile input device is made of glass.

14. The portable computing device of claim 1, wherein the top surface of the tactile input device is made of glass.

15. The portable computing device of claim 1, wherein the instructions stored on the at least one memory device are further configured to cause the tactile input device to alternate scanning between the wireless scanner and the touch sensor, the alternation being synchronized based on a clock associated with the display.

16. A portable computing device comprising:
a base comprising a housing, the housing including a top portion, a bottom portion, and sides adjacent to both the top portion and the bottom portion, the housing being made of a conductive material, the top portion defining an aperture;
a trackpad module located within the aperture defined by the top portion of the base, the trackpad module comprising:
a first layer comprising a touch sensor, the touch sensor being configured to scan for changes in capacitance;
a second layer comprising at least a first near field communication (NFC) coil and a second NFC coil, the first and second NFC coils being configured to send and scan for wireless signals; and
a third layer comprising an NFC controller, the NFC controller being configured to process wireless signals received via the first and second NFC coils and send wireless signals via the first and second NFC coils; and
a lid rotatably attached to the base, the lid including a display.

17. The portable computing device of claim 16, wherein the second layer is located between the first and third layers.

18. The portable computing device of claim 16, further comprising a glass surface on a side of the first layer opposite from the second layer.

19. The portable computing device of claim 16, wherein the first NFC coil has a diameter that is at least twice a diameter of the second NFC coil.

20. The portable computing device of claim 16, wherein the trackpad is configured to operate in one of three modes:
a first mode in which no input is detected at either the touch sensor or the first and second NFC coils, the first mode comprising alternating between scanning at the touch sensor and scanning at the first and second NFC coils;
a second mode in which input is detected at the touch sensor and no scanning is performed at the first and second NFC coils; and
a third mode in which input is detected in at least one of the first NFC coil or the second NFC coil and no scanning is performed at the touch sensor.

21. The portable computing device of claim 20, wherein the trackpad is configured to respond to signals received from a processor of the portable computing device by entering either the first mode, the second mode, or the third mode.

* * * * *

UNITED STATES PATENT AND TRADEMARK OFFICE
CERTIFICATE OF CORRECTION

Page 1 of 1

PATENT NO. : 9,891,760 B2
APPLICATION NO. : 13/909724
DATED : February 13, 2018
INVENTOR(S) : Tenuta It is certified that error appears in the above-identified patent and that said Letters Patent is hereby corrected as shown below:

On the Title Page

On Page 2, Column 1, item (56), under "OTHER PUBLICATIONS", Line 7, delete "-smancard-" and insert -- -smartcard- --, therefor.

In the Claims

In Column 15, Lines 62-64, Claim 10, delete "the at least......base." and insert the same at Line 63 as a new point.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*